Jan. 10, 1950  H. G. KELLOGG  2,494,096
APPARATUS FOR SECURING WORKPIECES TOGETHER
Filed April 15, 1946  4 Sheets-Sheet 3
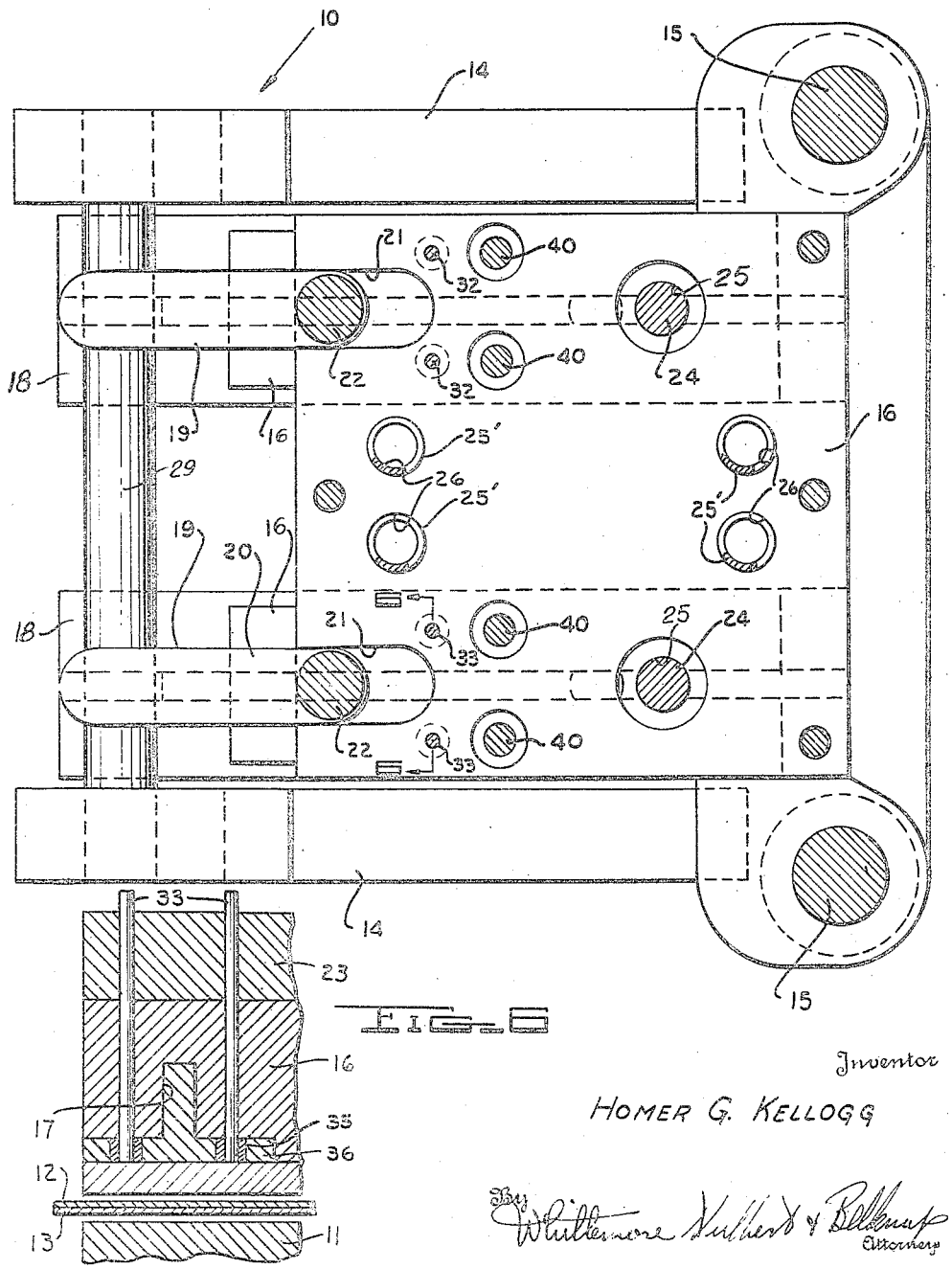
Inventor
HOMER G. KELLOGG Jan. 10, 1950         H. G. KELLOGG         2,494,096
APPARATUS FOR SECURING WORKPIECES TOGETHER
Filed April 15, 1946         4 Sheets—Sheet 4
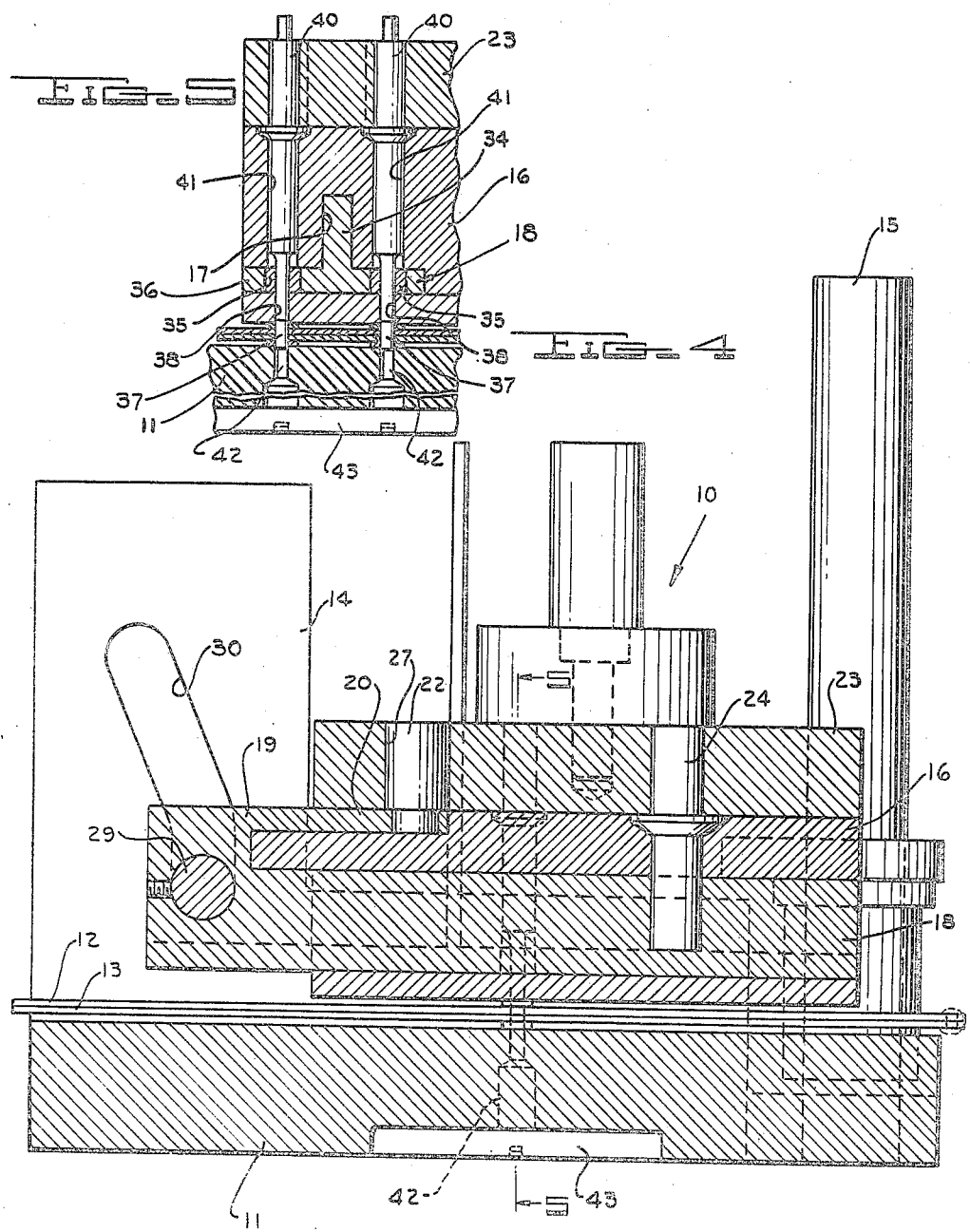
Inventor
HOMER G. KELLOGG Patented Jan. 10, 1950

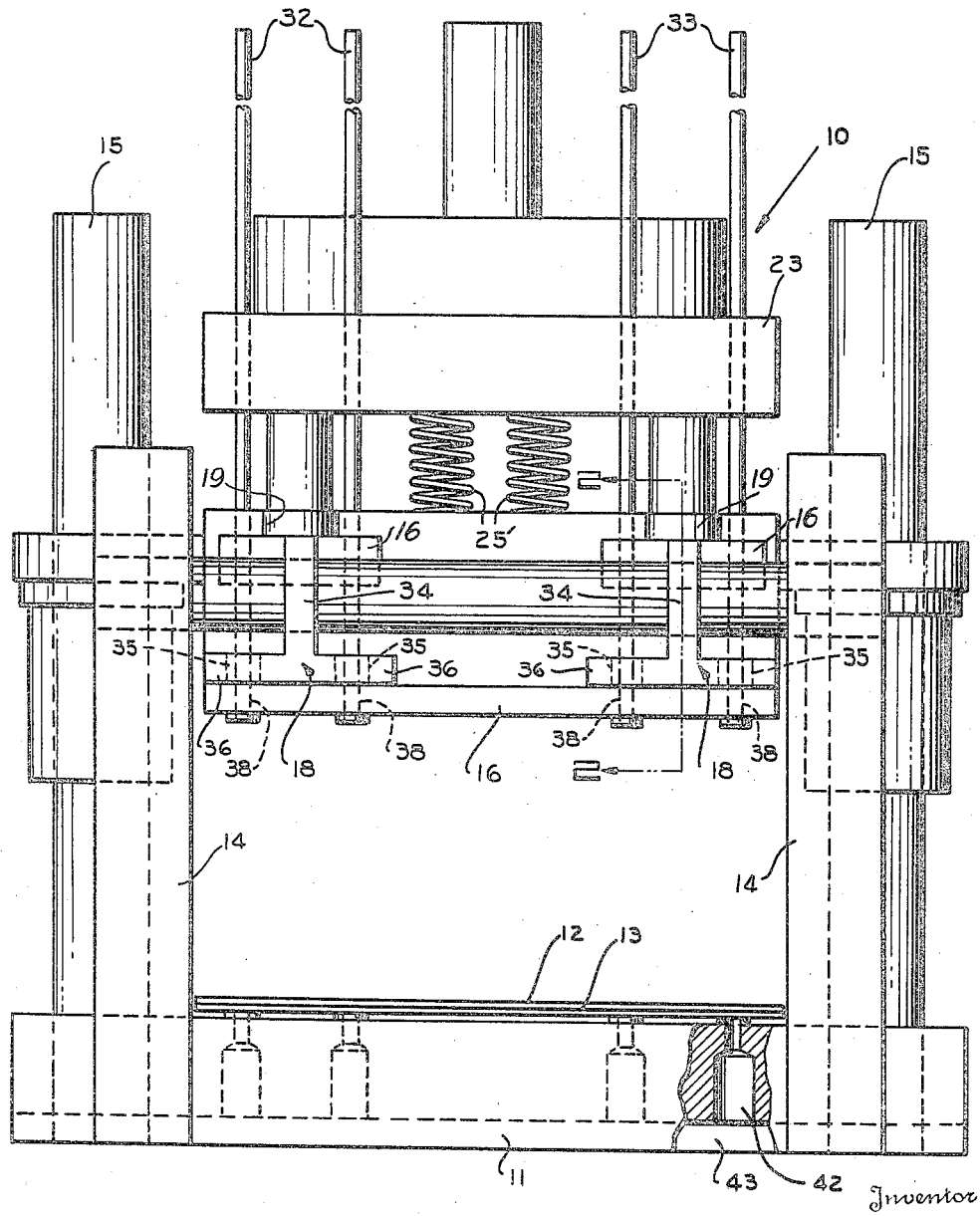

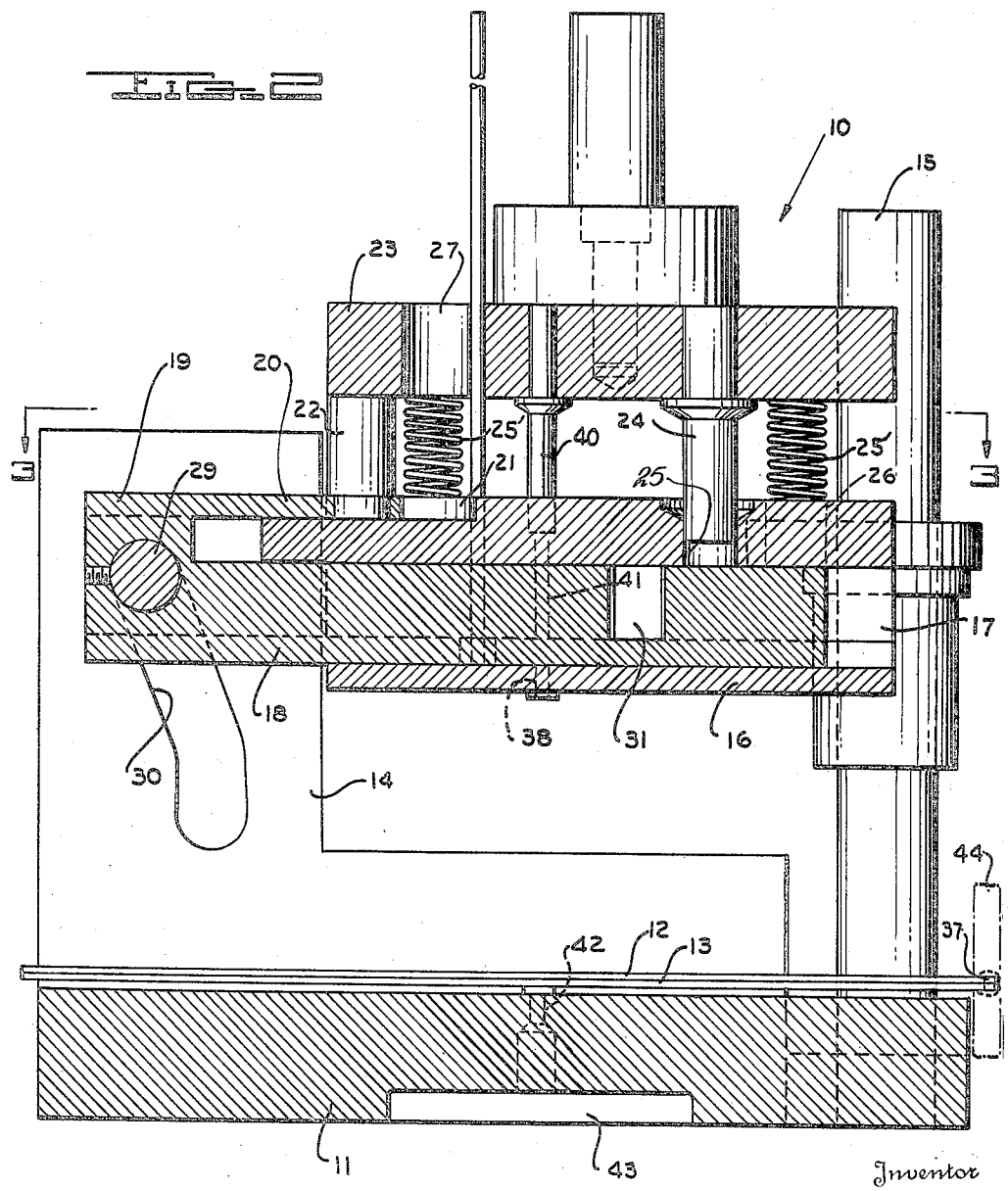

2,494,096

UNITED STATES PATENT OFFICE 2,494,096

APPARATUS FOR SECURING WORKPIECES TOGETHER

Homer G. Kellogg, Highland Park, Mich., assignor to Motor Products Corporation, Detroit, Mich., a corporation of New York Application April 15, 1946, Serial No. 662,339

6 Claims. (Cl. 1—1)

This invention relates generally to assembly fixtures and refers more particularly to improvements in apparatus for securing parts together by pins.

When securing sheet metal parts or plates together by pins, it has been customary to: first, punch openings in the parts at the required locations; second, insert the pins into the openings; and third, peen the pins to secure the same to the parts. This procedure is not only relatively slow due to the number of operations involved, but is none too satisfactory, because the openings must necessarily have a diameter sufficiently greater than the diameter of the pins to enable freely inserting the latter into the openings. There is a tendency, therefore, for one part to shift relative to the other an amount depending upon the clearance existing around the pins and this is, of course, objectionable.

One of the objects of this invention is to simplify the fastening procedure by eliminating the necessity of providing a separate punching operation to form the openings for receiving the pins. In accordance with this invention, the openings are formed by punching the parts with the pin stock, so that the openings are formed and the pins are positioned in the openings in one operation. Also, with this arrangement, the pins inherently snugly fit the openings and relative shifting of the parts is prevented.

The foregoing as well as other objects will be made more apparent as this description proceeds, especially when considered in connection with the accompanying drawings, wherein:

Figure 1 is an end elevational view of an assembly fixture embodying the features of this invention;

Figure 2 is a sectional view through the fixture shown in Figure 1;

Figure 3 is a sectional view taken on the plane indicated by the line 3—3 of Figure 2;

Figure 4 is a sectional view similar to Figure 2 showing the parts in another position;

Figure 5 is a sectional view taken on the line 5—5 of Figure 4; and

Figure 6 is a sectional view taken on the line 6—6 of Figure 3.

In the several figures of the drawings, the numberal 10 indicates an assembly fixture having a base 11 for supporting the parts to be secured together. In the present instance, the parts are in the form of two sheet metal plates 12 and 13 adapted to be secured together at longitudinally spaced intervals by four pins spaced from each other transversely of the parts. The base 11 is formed with upwardly projecting portions 14 at opposite sides and is provided with upwardly extending columns 15 at one end. A plate 16 is supported on the columns for vertical sliding movement and is formed with laterally spaced inverted T-shaped recesses 17 extending from one end of the plate to the other. Correspondingly shaped slides 18 are respectively slidably mounted in the recesses 17 and head portions 19 are formed at the front ends of the slides. The head portions are formed with rearwardly extending projections 20 arranged to slidably engage in recesses 21 formed in the top surface of the plate 16 and are provided with upwardly extending rest pins 22 at the rear ends of the projections for engaging the bottom surface of a vertically movable platen 23.

The platen 23 is guided by vertically spaced pins 24 having the upper ends secured to the plunger and having the lower ends engageable in bores 25 formed in the upper portion of the plate 16. The platen 23 is normally urged in an upward direction by pairs of coil springs 25' located in recesses 26 adjacent opposite ends of the plate 16 and having the upper ends abutting the bottom surface of the platen. The platen 23 is normally held in its uppermost position relative to the plate 16 by the pins 22, and is formed with openings 27 immediately in rear of the pins 22 for receiving the latter upon rearward sliding movement of the slides 18.

The slides 18 are moved simultaneously in a rearward direction by pin 29 projecting laterally outwardly from the head portions 19 at the front ends of the slides into cam slots 30 respectively formed in the projections 14 on the base 11. The cam slots 30 extend in a general vertical direction, and the upper portions of the slots are inclined in a forward direction. In other words, the contour of the cam slots 30 is such as to shift the slides 18 in a forward direction from the position shown in Figure 2 of the drawings to the position shown in Figure 4, when the supporting plate 16 is moved downwardly by the platen 23. The lengths of the slots 30 is such as to permit downward movement of the supporting plate 16 into engagement with the uppermost part 12, so that this plate cooperates with the base 11 in clamping the parts to be riveted in place.

During initial downward movement of the supporting plate and associated parts, the slides 18 are moved rearwardly to register the pins 22 with the openings 27 in the platen and to register the openings 31 in the slides 18 with the pins 24. Thus, continued downward movement of the platen is permitted after the supporting plate is engaged with the part 12 to be riveted to the part 13, so that in the final position of the parts shown in Figure 4 of the drawings, the platen 23 engages the top surface of the supporting plate 16.

Upon reference to Figures 1, 3 and 6 of the drawings, it will be noted that two pair of rods 32 and 33 of pin stock extend downwardly through openings formed in the platen 23. The lower end portions of the pair 32 extend into bores formed in the supporting plate 16 at opposite sides of the stem portion 34 of one slide 18 and project into bushings 35. The bushings 35 are secured in openings formed in the flanges 36 on the above slide. The lower end portions of the rods 33, on the other hand, extend into bores formed in the supporting plate 16 at opposite sides of the stem portion 34 on the other slide 18, and project into bushings 35 which are secured in openings formed in the flange portions 36 of this latter slide.

The length of the bushings 35, or in other words, the thickness of the flange portions 36 of the slides 18, corresponds substantially to the length of the pins required to secure the parts 12 and 13 together. The above arrangement is such that during initial sliding movement of the slides 18 in a rearward direction, the portions of the pin stock in the bushings 35 is severed from the remaining portions to provide four individual pins indicated in the drawings by the reference character 37. When the slides 18 reach their rearwardmost positions with respect to the plate 16 or, in other words, are in the position shown in Figure 4 of the drawings, the bushings 35 register the pins 37 therein with openings 38 formed in the bottom portion of the plate 16.

As stated above, the slides 18 are moved rearwardly upon initial downward movement of the supporting plate 16, so that the pins 37 are severed and shifted rearwardly into registration with the openings 38 at the same time the pins 22 and 24 respectively register with the openings 37 and 25. In other words, during the interval the platen 23 is permitted to move downwardly relative to the supporting plate 16, the pins 37 are in registration with the openings 38 in the supporting plate, and the latter is engaged with the part 12 on the base 11.

During movement of the platen downwardly relative to the supporting plate 12, the pins 37 are forced through the plates 12 and 13 in the manner indicated in Figure 5 of the drawings. In detail, punches 40 are secured to the platen 23 and extend downwardly into bores 41 formed in the part 16. The number of punches correspond to the number of pins 37, and the punches are respectively supported in alignment with the openings 38 in the bottom portion of the supporting plate 16. In other words, the arrangement of the punches is such that when the slides 18 are in their rearwardmost positions, the punches are respectively aligned with the bushings 35 and the openings 38. As a result, during initial movement of the platen 23 in a downward direction, the lower end portions of the punches respectively engage the upper ends of the pins and force the latter downwardly through the bushings 35 and openings 38 into engagement with the top plate 12. Continued downward movement of the platen causes the punches to force the pins through the plates 12 and 13. In other words the plates are punched by the pins themselves and the stock removed drops through the openings 42 in the base 11 to the recess 43. As shown particularly in Figure 5 of the drawings, the downward movement of the punches is limited to position the pins 37 in the plates so that opposite ends of the pins project beyond opposite sides of the plates.

After the plates have been punched by the pins 37 and the latter are positioned in the aligned openings thus provided in the plates, the platen 23 together with the supporting plate 16, is returned to its uppermost position shown in Figure 2 of the drawings. During this upward movement of the platen 23, the cam slots 30 cooperate with the pin 29 to again return the slides 18 to their forwardmost positions. The plates are then advanced along the base 11 to locate the same for the next cycle of operation.

If desired, the above equipment may be used in connection with the riveting apparatus, diagrammatically shown by the reference character 44. This apparatus forms no part of this invention and it will suffice to point out that it comprises means for peening opposite ends of the pins previously inserted in the plates while the latter are being punched for the reception of additional pins.

Thus from the foregoing, it will be observed that the above fixture enables punching the plates with the actual pins to be subsequently employed in securing the plates together. This not only simplifies the pinning procedure, but also assures obtaining a tight fit of the pins in the openings in the plates and relative shifting movement of the plates is thereby prevented.

What I claim as my invention is:

1. An assembly fixture comprising means for supporting parts to be joined together; a plate movable in a direction toward the supporting means into engagement with one of said parts and having an elongated recess therein, said plate having an opening through the portion above the recess for receiving a length of pin stock and having aligned openings at opposite sides of the recess spaced from the first opening, a slide in said recess having an opening therethrough for receiving the lower end of the pin stock, means responsive to movement of the plate in said one direction to shift the slide in a direction to shear the end portion of the pin stock from the remainder thereof and position the sheared portion between the second mentioned openings in alignment with the latter, and means engageable with the sheared portion of the pin stock in the last named position of the slide to force the sheared portion through both said parts.

2. An assembly fixture comprising means for supporting parts to be secured together; a plate movable in a direction toward the supporting means into engagement with one of said parts and having an elongated recess therein; said plate having an opening through the portion above the recess for receiving a length of pin stock and having aligned openings at opposite sides of the recess spaced from the first opening, a slide in said recess having an opening therethrough for receiving the lower end of the pin stock, a platen for moving the plate in said one direction and movable relative to said plate upon engagement of the latter with the parts to be pinned; means responsive to movement of the plate by said platen to shift the slide in a direction to shear a pin from the end of the stock and position the pin between the second mentioned openings in alignment with the latter; and means responsive to movement of the platen relative to the plate to force the pin through both said parts.

3. An assembly fixture comprising means for supporting work pieces to be secured together, a member movable in a direction toward the supporting means and having vertically spaced parts, said member having an opening through the top part for receiving a length of pin stock and having aligned openings through both parts spaced from the first opening, a slide supported between said parts for sliding movement and having an opening therethrough registerable in one position of the slide with the opening in the top part for receiving the lower end of the pin stock, means responsive to movement of the member in a direction toward the supporting means to shift the slide from the position aforesaid thereof in a direction to shear the lower end portion of the pin stock from the remainder thereof and position said sheared portion in alignment with the aligned openings in the top and bottom parts of said member, and means movable through the aligned openings in said member and slide for forcing the sheared portion of the pin stock through the work pieces.

4. An assembly fixture comprising means for supporting work pieces to be secured together, a member movable in a direction toward the supporting means and having vertically spaced parts, said member having an opening through the top part for receiving a length of pin stock and having aligned openings through both parts spaced from the first opening, a slide supported between said parts for sliding movement and having an opening therethrough registerable in one position of the slide with the opening in the top part for receiving the lower end of the pin stock, means responsive to movement of the member in a direction toward the supporting means to shift the slide from the position aforesaid thereof in a direction to shear the lower end portion of the pin stock from the remainder thereof and position said sheared portion in alignment with the aligned openings in the top and bottom parts of said member, a punch supported above the slide in alignment with the aligned openings for moving the sheared portion downwardly through the registering opening in the bottom part and for forcing said sheared portion through the work pieces, and means for operating the punch in timed relation to movement of the slide in a direction to locate the sheared portion in alignment with the aligned openings.

5. An assembly fixture comprising means for supporting work pieces to be secured together, a member movable in a direction toward the supporting means and having vertically spaced parts, said member having laterally spaced openings through the top part for respectively receiving lengths of pin stock and having correspondingly laterally spaced pairs of aligned openings through both parts spaced from the first named openings, a slide supported within the space between said parts for sliding movement and having laterally spaced openings therethrough registerable in one position of the slide with the first named laterally spaced openings in the top part of said member for respectively receiving the lower ends of the pin stock, means responsive to movement of the member toward the supporting means to shift the slide from the position aforesaid thereof in a direction to shear the lower end portions of the pin stock from the remainder thereof and respectively position the sheared portions in alignment with the aligned pairs of openings in the top and bottom parts of said member, and means for forcing the sheared portions of the pin stock through the work pieces.

6. An assembly fixture comprising means for supporting work pieces to be secured together, a member movable in a direction toward the supporting means and having vertically spaced parts, said member having laterally spaced openings through the top part for respectively receiving lengths of pin stock and having correspondingly laterally spaced pairs of aligned openings through both parts spaced from the first named openings, a slide supported within the space between said parts for sliding movement and having laterally spaced openings therethrough registerable in one position of the slide with the first named laterally spaced openings in the top part of said member for respectively receiving the lower ends of the pin stock, means responsive to movement of the member toward the supporting means to shift the slide from the position aforesaid thereof in a direction to shear the lower end portions of the pin stock from the remainder thereof and respectively position the sheared portions in alignment with the aligned pairs of openings in the top and bottom parts of said member, a pair of punches supported above the slide in positions to respectively register with the pairs of aligned openings for moving the sheared portions downwardly through the openings in the bottom part and for forcing the sheared portions through the work pieces, and means for operating said punches in timed relation to movement of the slide in a direction to locate the sheared portions in alignment with the aligned pairs of openings.

HOMER G. KELLOGG.

REFERENCES CITED

The following references are of record in the file of this patent:

UNITED STATES PATENTS

| Number | Name | Date |
| --- | --- | --- |
| 243,601 | Newton | June 28, 1881 |
| 280,190 | Knowlton | June 26, 1883 |
| 2,293,624 | Parkhurst | Aug. 18, 1942 |
| 2,420,290 | Willhauck | May 13, 1947 |